Patented Feb. 22, 1938

2,108,960

UNITED STATES PATENT OFFICE 2,108,960

PROCESS FOR BREAKING PETROLEUM EMULSIONS

Melvin De Groote, University City, Bernhard Keiser, Webster Groves, Leonard L. Faure, Kirkwood, and Arthur F. Wirtel, Webster Groves, Mo., assignors to The Tret-O-Lite Company, Webster Groves, Mo., a corporation of Missouri No Drawing. Original application March 16, 1936, Serial No. 69,222. Divided and this application March 15, 1937, Serial No. 130,894

4 Claims. (Cl. 196—4)

This invention relates to the treatment of emulsions of mineral oil and water, such as petroleum emulsions, for the purpose of separating the oil from the water, our present application being a division of our application, Ser. No. 69,222, filed March 16, 1936.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of our invention is to provide a novel and inexpensive process for separating emulsions of the character referred to into their component parts of oil and water or brine.

Briefly described, our process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent contemplated by our process consists of or comprises a cyclohexylamine salt of a poly-alkylated naphthalene sulfonic acid in which there are present at least two different alkyl groups, each one containing at least three carbon atoms and not more than ten carbon atoms. Such compounds are nuclear substituted products.

Commercial demulsifying agents employed for breaking or resolving oil field emulsions include, among other substances, substituted polycyclic aromatic sulfonic acids, or their salts. The type which finds most frequent application is obtained by introducing one, two or more alkyl groups into a naphthalene residue and then producing the sulfonic acid. Due to the corrosiveness of the sulfonic acid, it is the usual practice to employ the reagent in the form of a salt, such as ammonium salt, potassium salt, sodium salt, etc.

We have discovered that if a poly-alklated naphthalene sulfonic acid of the kind hereinafter described is neutralized with cyclohexylamine, one obtains a reagent of unusual effectiveness. There does not appear to be any suitable explanation of this unusual superiority, and similarly, there does not seem to be any basis by which one could anticipate or foresee this unusual effectiveness. Apparently, this marked improvement is not directly related to oil or water solubility, insofar that similar neutralization with other amines may yield compounds which have a greater solubility in oily materials or in water, and yet are not nearly as suitable and not nearly as effective in their demulsifying action.

Apparently, there is some unlooked-for cooperation or chemical or physical-chemical relationship between the cyclohexylamine residue and the sulfo-aromatic residue. The neutralization of other conventional acidic demulsifying reagents with cyclohexylamine does not seem to produce any marked improvement over the corresponding sodium or ammonium salts, and in many cases, yields an inferior product, thus indicating that apparently the increased value does not reside in an additive effect, due to the cyclohexylamine residue. Furthermore, the effectiveness of cyclohexylamine apparently is not enjoyed by various other amines which bear some similarity to this material, such as aniline, toluidine, propylamine, diamylamine, etc. In other words, if the same poly-alkylated naphthalene sulfonic acids which are employed to produce the treating agent or demulsifying agent used in our process are neutralized with many other apparently kindred amines, one does not obtain a reagent that even begins to approach the effectiveness of the demulsifying agent used in our process. Similarly, if one neutralizes other sulfonic acids, which are known to be effective demulsifying agents, such as petroleum sulfonic acids of the mahogany acid type, with cyclohexylamine, one does not obtain a more effective demulsifying agent, and indeed, one is more likely to obtain a demulsifying agent which is less effective. Based on the results of actual tests obtained in a variety of emulsified crudes occurring in a number of the major oil fields of the United States, the conclusion one must inevitably reach is, that the result obtained by uniting the two residues, i. e., the cyclohexylamine residue and the described sulfo-aromatic residue in a single molecule, results in an unlooked-for, unique quality, which could not be foreseen by the present knowledge of the art, and which produces a demulsifying agent that is particularly effective for a large number of emulsified crude oils.

Poly-alkylated naphthalene sulfonic acids are produced commercially, and the salts are used for a variety of purposes. They are generally produced from naphthalene, because there does not appear to be any advantage in the use of a naphthalene derivative, such as chlor-naphthalene, alpha and beta naphthol, etc. In other words, one could introduce the sulfonic acid residue and the alkyl residues into a substituted naphthalene, such as chlor-naphthalene, etc., just as readily perhaps as in the case of naphthalene. However, such derivatives are more expensive and no advantage is obtained. Such simple derivatives, of course, are the chemical equivalent of naphthalene in the manufacture of such sulfonic acids as are employed in the manufacture of the present reagent. It is understood that the word "naphthalene" is hereinafter employed to include these derivatives, although, as pointed out, there is no advantage in using them, and the expense usually would be prohibitive.

The general process of manufacturing the demulsifying agent contemplated by our process, consists in converting the naphthalene into either the alpha or beta naphthalene sulfonic acid, or in some instances, into a di- or even a tri-sulfonic acid. In most instances there is no advantage in introducing more than one sulfonic acid residue. In many instances it is unnecessary to use particular care to prepare either only the alpha sulfonic acid, or either only the beta sulfonic acid, because a mixture in which either one or the other predominates, or a mixture in which the alpha and beta sulfonic acids are present in approximately equal amounts, is just as satisfactory as one sulfonic acid completely freed from the other type.

The alcohol employed, such as propyl alcohol, butyl alcohol, amyl alcohol, hexyl alcohol, decyl alcohol, etc. is converted into the acid sulfate, such as propyl hydrogen sulfate. The naphthalene sulfonic acid and the alkyl hydrogen sulfates are combined in proportions so that two, three, or even four alkyl groups are introduced into the aromatic residue. This condensation reaction is generally carried out in the presence of an excess of sulfuric acid. In some instances, the various reactions, such as sulfonation, sulfation, condensation, etc. are carried out simultaneously. Generally speaking, the di-alkylated and tri-alkylated material appear to yield the most desirable type of reagent.

It is obvious, of course, that the alkylated groups introduced might be derived from olefines, such as butylene, propylene, amylene, etc., insofar that such olefines react directly with sulfuric acid, to produce the alkyl hydrogen sulfates. Of course, in addition to introducing such alkyl residues of the kind described into the aromatic nucleus, one could also introduce an alkyl residue from some other alcohol, as, for example, an alkylated group derived from ethyl or methyl alcohol, or one might introduce a group derived from an aryl, aralkyl, or cyclo-alcohol, but regardless of whether or not one introduces such other residues, it is necessary that at least two different alkyl residues of the kind described, i. e., having at least three carbon atoms and not more than ten carbon atoms, be introduced into the naphthalene ring. Such compounds having some other residue present, such as a methyl residue, might be considered as being derived from methyl naphthalene, instead of naphthalene, and thus, would fall within the class of chemical equivalents previously noted. It is immaterial as to the particular alcohol employed, or the particular isomeric form of the alcohol employed, although generally speaking, it is most desirable to use the one lowest in cost. It is immaterial whether one uses normal propyl alcohol or isopropyl alcohol. It is immaterial whether one uses a normal butyl or isobutyl alcohol. It is immaterial whether the alcohol be a primary alcohol, or a secondary alcohol, or a tertiary alcohol, or the like.

It is obvious that a large number of isomers can be produced in the manufacture of the reagent employed in the present process. For instance, although the sulfonic group may be introduced into either the alpha or beta position, it is manifest that the alkyl groups can be introduced into various positions in regard to the position of the sulfonic acid residue. Apparently, as far as we are aware, one isomeric form is as effective as the other. Reference to the compounds is not intended to indicate any particular isomer, unless the text clearly indicates some specific position.

Insofar that the most readily available alcohols, from the standpoint of cost, are isopropyl alcohol, normal butyl alcohol, isobutyl alcohol, and amyl alcohol, it is our preference to produce our reagents from these alcohols, and it is also essential that the reagent employed in the present process be such a kind that at least two different alkyl groups or residues are introduced into the same sulfo-naphthalene residue. Obviously, two alkyl groups of the same kind may be introduced provided there is at least one more alkyl group of a different kind also introduced into the aromatic nucleus.

In the actual manufacture of alkylated naphthalene sulfonic acids, the completion of the desired chemical reactions is followed by a washing process which removes the excess of sulfuric acid or other sulfonation, sulfation, or condensation reagent employed. The acidic mass thus obtained is neutralized with cyclohexylamine in the same manner that sodium or potassium or ammonium hydroxides might usually be employed. The final product, if it represents a pasty or semi-solid or a solid mass, is rendered suitable for industrial use by the addition of a solvent, such as water, an alcohol, a coal tar solvent, a petroleum hydrocarbon solvent, or in any similar manner.

The demulsifying agent that we prefer to use in practising our process is obtained by a reaction in which two moles of isopropyl alcohol and one mole of normal butyl alcohol are united with one mole of naphthalene by the customary sulfation, sulfonation and condensation reactions. Generally speaking, it is easier to conduct the reaction so that the bulk of the sulfonic acid represents the beta type, although the alpha type may be produced, if desired. The neutralized product is diluted with one or more solvents, so as to reduce its viscosity to that of ordinary castor oil, or slightly greater. The solvents which we preferably employ are a mixture of two or more of the following: Water, denatured alcohol, kerosene, or tar acid oil.

Among the reagents which are particularly effective are the cyclohexylamine salts of the following alkylated naphthalene sulfonic acids, i. e., mono-isopropyl, di-normal butyl naphthalene sulfonic acid, di-isopropyl di-normal butyl naphthalene sulfonic acid, di-isopropyl, mono-amyl naphthalene sulfonic acid, mono-isopropyl, mono-hexyl naphthalene sulfonic acid, etc.

It may be desirable to indicate that there is sometimes some variation in nomenclature in regard to the salts derived from strong acids and various amines. For instance, the combination of aniline, and hydrochloric acid, is often referred to as aniline hydrochloride. When aniline hydrochloride is treated with caustic soda, aniline is regenerated and sodium chloride formed. For this reason, and perhaps for other reasons, structural conditions are best expressed by referring to the compound as a hydrochloride, in order to indicate that one does not obtain the chloride of a quarternary ammonium compound. Similarly, the reaction of cyclohexylamine with a sulfonic acid may be considered as producing the cyclohexylamine salt, although for reasons pointed out, such salt might be looked upon as a cyclohexylamine hydrogen sulfonate, as well as being considered as a cyclohexylamine sulfonate. Insofar that it is perfectly clear as to the chemical composition of the compound, it is immaterial which nomenclature is employed.

In such instances where there is present more than one sulfonic acid residue, as in the formation of a di-sulfonic acid, or a tri-sulfonic acid, if desired, all the sulfonic acid hydrogen may be neutralized with cyclohexylamine, or if desired, only one sulfonic hydrogen may be neutralized with cyclohexylamine, and the other sulfonic hydrogen atom or atoms may be neutralized with some other suitable base, such as sodium hydroxide, potassium hydroxide, ammonium hydroxide, etc.

Cyclohexylamine salts, such as the hydrochloride, may react by double decomposition with alkali salt sulfonates in a suitable medium to produce the cyclohexylamine sulfonate.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc. may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfo-aromatic type, in which the sulfonic hydrogen is neutralized by the use of some base other than cyclohexylamine.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

Having thus described our invention, what we claim as new and desire to secure by Letters Patent is:

1. A process for breaking petroleum emulsions of the water-in-oil type, which consists in subjecting the emulsion to the action of a demulsifying agent comprising a cyclohexylamine salt of a poly-alkylated naphthalene sulfonic acid in which there are present at least two different alkyl groups, each one containing at least three carbon atoms and not more than ten carbon atoms.

2. A process for breaking petroleum emulsions of the water-in-oil type, which consists in subjecting the emulsion to the action of a demulsifying agent comprising a cyclohexylamine salt of a poly-alkylated naphthalene sulfonic acid containing at least one propyl group and at least one butyl group.

3. A process for breaking petroleum emulsions of the water-in-oil type, which consists in subjecting the emulsion to the action of a demulsifying agent comprising a cyclohexylamine salt of a poly-alkylated naphthalene sulfonic acid containing at least one propyl group and at least one amyl group.

4. A process for breaking petroleum emulsions of the water-in-oil type, which consists in subjecting the emulsion to the action of a demulsifying agent comprising a cyclohexylamine salt of a poly-alkylated naphthalene sulfonic acid containing at least one butyl group and at least one amyl group.

MELVIN DE GROOTE.
BERNHARD KEISER.
LEONARD L. FAURE.
ARTHUR F. WIRTEL.